123. INTERNAL COMBUSTION ENGINES.

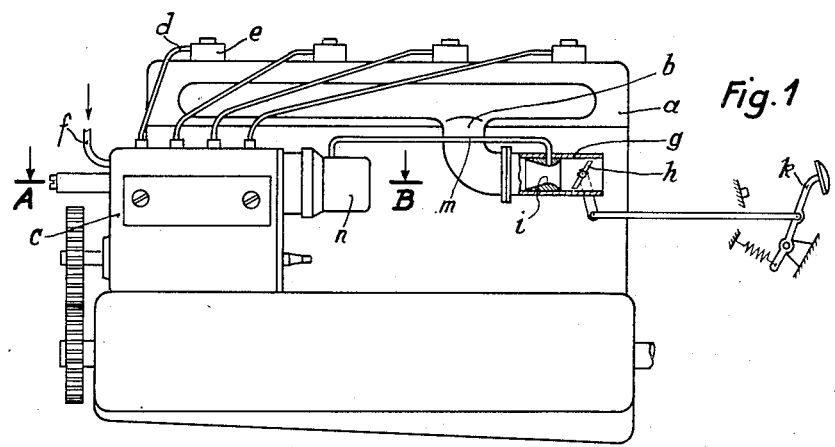
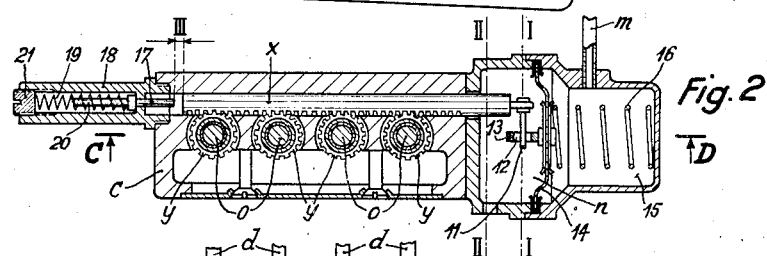
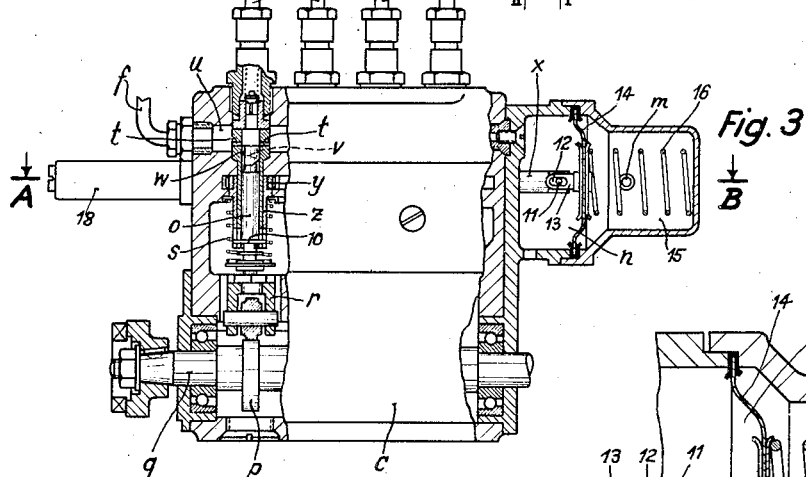
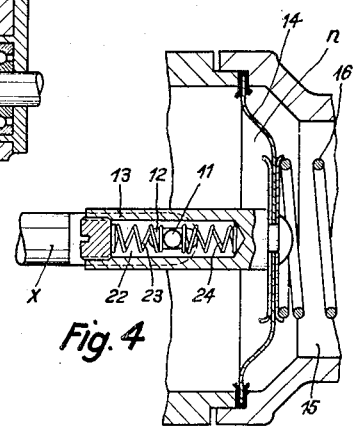

139    Patented Dec. 14, 1937

Search Room 2,102,338

UNITED STATES PATENT OFFICE

2,102,338

GOVERNOR MEANS FOR LIQUID INJECTION INTERNAL COMBUSTION ENGINES

Alfred Schweizer, Stuttgart, Germany, assignor to Robert Bosch Aktiengesellschaft, Stuttgart, Germany Application April 26, 1935, Serial No. 18,418
In Germany May 25, 1934

6 Claims. (Cl. 123—139)

The present invention relates to governors for controlling the amount of fuel injected in internal combustion engines, operating with injection of liquid fuel, more especially for Diesel engines for vehicles. The arrangement consists of a servo-motor, connected to the delivery-amount adjusting member of the injection plant, which responds to the difference, varying with the engine speed and also with the adjustment of a voluntarily operable governing member, between a returning force and an oppositely acting pulsating, and usually pneumatic, governing force that is produced by a jerkily operating pump (for example, by the engine itself), and which varies in accordance with the speed of the engine.

In the known governors of this kind, in addition to the comparatively long-range desirable oscillations, the movable member of the servo-motor oscillates undesirably and within a comparatively short range, especially within the lower governing range of the engine, that is, mainly when running idle and under a small load, and in doing so, carries with it the delivery-amount adjusting member connected to it and other adjusting members of the injection plant connected thereto. This undesirable short-range hunting oscillation of the delivery-amount adjusting members causes undesirable wear and sometimes unfavourably influences the governing operation. In the upper governing range of medium and high loads those undesirable hunting oscillations are hardly perceptible, although even here, especially at high speeds, the pulsating undesirable oscillations caused by the producer of the governing force do exist. These undesirable oscillations follow each other much more rapidly than in the lower governing range, where the speed is mostly lower. At high speeds, therefore, the time for adapting the governing pressure in the servo-motor to each shock might be too short to produce oscillations of the movable member of the servo-motor. Even the inertia of the movable member of the servo-motor and the members of the injection plant coupled thereto damps in this case the oscillation of these members to an acceptable extent.

In order now to avoid an undesirable oscillation of the delivery-amount adjusting members of the injection plant even at the lower range of speeds, according to the invention the coupling between the movable member of the servo-motor and the delivery-amount adjusting member of the injection plant is so constructed that at least in this governing range only the movable member of the servo-motor can follow the pulsating fluctuations of the governing force without at the same time carrying with it the delivery-amount adjusting member.

Two examples of construction of the invention are shown in the accompanying drawing, in which:—

Figure 1 is an elevation of the air suction pipe side of a four-cylinder Diesel engine suitable for vehicles.

Figure 2 shows on a larger scale than Fig. 1 a section on the line A—B of Figs. 1 and 3 through the injection pumping plant and the servo-motor built thereon.

Figure 3 shows the injection pump and servo-motor in partial longitudinal section on the line C—D of Fig. 2.

Figure 4 shows as a second example of construction a modified form of the coupling or connection between the servo-motor and the delivery amount adjusting member shown in Figures 2 and 3.

In Figure 1, $a$ is a four-cylinder Diesel engine, $b$ its air suction pipe, and $c$ an injection pump built on the engine and driven by it in synchronism with the working operation, and having four separate pumps which inject their controllable delivery amount through pressure pipes $d$, nozzle-holders $e$ and nozzles secured thereto (not shown) into the engine cylinders. The fuel is supplied to the separate pumps through a pipe $f$ connected to the common pump casing from a container (not shown).

A pipe $g$ is flanged to the inlet of the suction pipe $b$ common to all the engine cylinders, and contains a throttle-valve $h$ shown in the idle-running position, and behind it—looked at in the direction of flow of the air—a Venturi constriction $i$. The driver can adjust the throttle valve at will to any desired opening position by a pedal lever $k$ and thereby influence the vacuum in the suction pipe that is utilized as the governing force. A pipe $m$ branches off from the narrowest point of the Venturi tube, and leads to a servo-motor $n$ built on the casing of the injection pump.

The construction of the injection pump is shown in Figure 3. The pistons $o$ of the separate pumps are raised by cams $p$ on the shaft $q$ connected to the engine through plungers $r$ and returned by springs $s$. Towards the end of their suction stroke they control passages $t$ in the cylinder bush through which fuel passes from the common suction chamber $u$ connected to the supply pipe $f$ into the cylinder chambers. On the pressure-stroke each of the pistons $o$ delivers fuel through a pressure valve into its pressure pipe *d*, after closing the passages *t* by a controlling face *v*, obliquely cut away, provided below its top, until the oblique controlling face *v* again opens one of the passages *t* to by-pass fuel. The fuel forced in the further course of the pressure stroke of the piston can then flow back through a groove *w* in the controlling face *v* through the opened passage into the suction chamber *u*. To alter the amount of fuel passing to the pressure pipe *d* and thus to the injection, the piston can be rotated relative to the passages *t*, so that a shorter or longer section of the oblique controlling face closes the return passage *t* for a shorter or longer portion of the pressure stroke. The rotation of all the pistons of the separate pumps is effected simultaneously and uniformly by the displacement of a delivery-amount adjusting member constructed as a toothed rackbar *x*. The rackbar *x* is guided in the pump casing and meshes with pinions *y*. One such pinion is provided for each of the four separate pumps, and is secured on a sleeve *z* inserted over the cylinder bush of each separate pump. The lower end of each sleeve projects beyond the cylinder bush and is slotted. A cross-piece 10 firmly connected with the respective pump piston engages in the slot.

The right-hand end of the rackbar *x* projects into a chamber in the servo-motor fixed on the pump casing and carries a cross-pin 11. This projects into a slot 12 in a bolt 13, which is secured in the centre of a diaphragm 14 reinforced by a plate in its central part. The edge of the diaphragm is clamped in the casing of the servomotor. In a chamber 15, situated to the right of the diaphragm, a helical spring 16 is arranged, which bears at one side against the reinforced central part of the diaphragm and at the other side against the bottom of the chamber 15. The spring 16 has a tendency to press the diaphragm towards the left and thus to push the rackbar *x* into that end position in which it adjusts the greatest injection amount of the pumps. The pipe *m* which leads from the Venturi contraction is connected to the chamber 15.

In the position shown in the drawing, in which the axis of the cross-pin coincides with the line I in Fig. 2, the injection amount necessary for maintaining idle running is adjusted. When the pin is moved into the position indicated by line II, the pump delivers the amount for running under full load.

The left-hand end of the rackbar engages as soon as it has moved to the left by the distance III from the idle running position, against the end of a pin 17, which is guided co-axially to the rackbar in a sleeve 18 fastened on the pump casing. A helical spring 19 having an adjustable initial compression has a tendency to hold the pin 17 in its right-hand end position shown in the drawing. The force of the return spring 16 of the servomotor can however push the pin against the force of the spring 19, on the displacement of the controlling rod to the left, until the end 20 of the pin abuts in the full load position against the adjustable screw 21.

The play of the cross-pin 11 in the slot 12 is about as large as the distance by which the diaphragm, shown in its idle running middle position in Figure 2, oscillates to and fro in consequence of the separate suction strokes in the motor cylinder, which extend as far as the governing chamber 15. The toothed rackbar is thus retained in substantially the position shown by I when running idly, and thus does not share in the undesirable oscillations of the diaphragm. As soon however as the rackbar has been displaced to the left by the distance III, which may be designated as the lower governing range, it is positively coupled without play to the diaphragm by the force of the spring 19 so long as it moves in the upper governing range. In the upper governing range the play in the connection between the rackbar and diaphragm can be cut out, because the variations in vacuum then produced in the engine suction pipe by the suction of the engine pistons do not act to such an extent that the diaphragm oscillates to an inconvenient extent.

In the second construction shown in Fig. 4, the buffer arrangement 17—21 provided in the first form of construction is dispensed with. The bolt 13 has here a longitudinal bore 22 containing a pair of opposing helical springs 23, 24, which undertake the buffering action. The springs 23, 24 bear with their opposing ends against the cross-pin 11 secured to the rackbar *x*, and with their other ends against the bolt 13, and have a tendency to hold the parts in the position shown in Fig. 4, in which the cross-pin 11 is at about the middle of the slot 12. The play of the pin 11 longitudinally of the slot here again corresponds to the total deflection of the diaphragm produced by the suction action of the engine when running idle. The compression of the springs 23 and 24 is so weak in this case, that on the oscillation of the diaphragm when running idle, no or hardly any movement of the governing rod is caused by the thereby varying compressions of the springs.

The constructions illustrated only show applications of the invention to governing arrangements in which the state of vacuum prevailing in the suction pipe of the engine is utilized as the governing force. The invention may be employed equally well in other governing arrangements, in which a governing force acting in jerks causes oscillations of the governing member.

I declare that what I claim is:

1. Governor means for liquid injection internal combustion engines comprising a control member adapted to adjust the fuel delivery, a servo member subject to a variable and pulsating governing force in one direction and a return force in the opposite direction variable in accordance with the position of the servo-member thereby causing comparatively long-range desirable oscillations and undesirable short-range hunting oscillations of said servo-member and a lost motion connection between said control member and said servo member permitting the servo member to oscillate under the influence of the pulsations of said governing force without transmitting such undesirable hunting oscillations to the control member at least within the range of movement of the servo-member corresponding to the lower speed range of the engine.

2. Governor means for liquid injection internal combustion engines comprising a control member adapted to adjust the fuel delivery, a servo member subject to a variable and pusating governing force in one direction and a return force in the opposite direction variable in accordance with the position of the servo-member thereby causing comparatively long-range desirable oscillations and undesirable short-range hunting oscillations of said servo-member and a lost motion connection between said control member and said servo-member adapted to afford play between the control member and the servo-member to a degree corresponding to the hunting amplitude of oscillation of the servo-member under the influence of the pulsations of the governing force and to permit the servo-member to oscillate under the influence of the pulsations of said governing force without transmitting such undesirable hunting oscillations to the control member at least within the range of movement of the servo-member corresponding to the lower speed range of the engine.

3. Governor means for liquid injection internal combustion engines comprising a control member adapted to adjust the fuel delivery, a servo member subject to a variable and pulsating governing force in one direction and a return force in the opposite direction variable in accordance with the position of the servo-member and a connection between said control member and said servo-member adapted to afford play between the control member and the servo-member to a degree corresponding to the amplitude of oscillation of the servo-member under the influence of the pulsations of the governing force and to permit the servo-member to oscillate under the influence of the pulsations of said governing force without transmitting such oscillations to the control member at least within the range of movement of the servo-member corresponding to the lower speed range of the engine, and buffer means for reducing the degree of play afforded by said connection as the servo-member moves into positions corresponding to the upper speed range of the engine.

4. Governor means for liquid injection internal combustion engines comprising a control member adapted to adjust the fuel delivery, a servo member subject to a variable and pulsating governing force in one direction and a return force in the opposite direction variable in accordance with the position of the servo-member and a connection between said control member and said servo-member adapted to afford play between the control member and the servo-member to a degree corresponding to the amplitude of oscillation of the servo-member under the influence of the pulsations of the governing force and to permit the servo-member to oscillate under the influence of the pulsations of said governing force without transmitting such oscillations to the control member at least within the range of movement of the servo-member corresponding to the lower speed range of the engine, and buffer means for reducing the degree of play afforded by said connection and for operatively coupling the servo-member and control member as the servo-member moves into positions corresponding to the upper speed range of the engine.

5. Governor means for liquid injection internal combustion engines comprising a control member adapted to adjust the fuel delivery, a servo-member subject to a variable and pulsating governing force in one direction and a return force in the opposite direction variable in accordance with the position of the servo-member and a connection between said control member and said servo-member adapted to afford play between the control member and the servo-member to a degree corresponding to the amplitude of oscillation of the servo-member under the influence of the pulsations of the governing force and to permit the servo-member to oscillate under the influence of the pulsations of said governing force without transmitting such oscillations to the control member at least within the range of movement of the servo-member corresponding to the lower speed range of the engine and resilient buffer means adapted for engagement by the control member as the control member reaches its range of movement corresponding to the upper speed range of the engine, said buffer means being opposed to the return force of the servo-member and adapted to reduce the degree of play in the connection between the servo-member and control member.

6. Governor means for liquid injection internal combustion engines comprising a control member adapted to adjust the fuel delivery, a servo-member subject to a variable and pulsating governing force in one direction and a return force in the opposite direction variable in accordance with the position of the servo-member, a pin-and-slot connection between the control member and the servo-member adapted to permit the servo-member to oscillate under the influence of the pulsations of said governing force without transmitting such oscillations to the control member and a spring adapted to operate on the control member within its upper speed range in opposition to the said return force of the servo-member for reducing the play between the servo-member and control member.

ALFRED SCHWEIZER.